US011919683B2

(12) United States Patent
Manneux

(10) Patent No.: US 11,919,683 B2
(45) Date of Patent: Mar. 5, 2024

(54) BOX OPENING MOVEMENT WITH GUIDES

(71) Applicant: WestRock Packaging Systems, LLC, Atlanta, GA (US)

(72) Inventor: Alexis Manneux, Chateauroux (FR)

(73) Assignee: WestRock Packaging Systems, LLC, Atlanta, GA (US)

(*) Notice: Subject to any disclaimer, the term of this patent is extended or adjusted under 35 U.S.C. 154(b) by 0 days.

(21) Appl. No.: 17/165,338

(22) PCT Filed: Jul. 25, 2019

(86) PCT No.: PCT/US2019/043352
§ 371 (c)(1),
(2) Date: Feb. 2, 2021

(87) PCT Pub. No.: WO2020/028127
PCT Pub. Date: Feb. 6, 2020

(65) Prior Publication Data

US 2021/0354871 A1 Nov. 18, 2021

Related U.S. Application Data

(60) Provisional application No. 62/713,636, filed on Aug. 2, 2018.

(51) Int. Cl.
*B65D 5/02* (2006.01)
*B31B 120/30* (2017.01)

(52) U.S. Cl.
CPC ...... *B65D 5/0236* (2013.01); *B31B 2120/302* (2017.08); *B65B 2220/04* (2013.01); *B65D 2565/385* (2013.01)

(58) Field of Classification Search
CPC .. B65D 5/0236; B65D 5/4266; B65D 5/0281; B65D 5/3621; B31B 50/26; B31B 2120/30; B31B 2120/302; B31B 50/44; B31B 50/81; B31B 50/004; B31B 50/78; B31B 2100/0022; B65B 5/024; B65B 7/20
(Continued)

(56) References Cited

U.S. PATENT DOCUMENTS 2,384,559 A * 9/1945 Powell ................ B65D 5/3621 229/117
4,936,815 A 6/1990 Kirkland et al.
(Continued)

FOREIGN PATENT DOCUMENTS

WO 2011/055361 A1 5/2011

OTHER PUBLICATIONS

International Search Report issued in PCT/US2019/043352, dated Oct. 15, 2019.

*Primary Examiner* — Christopher R Demeree
(74) *Attorney, Agent, or Firm* — Brian J. Goldberg; Rohini K. Garg

(57) ABSTRACT

A method of processing boxes includes shuttling a box in a first direction and cutting to separate outer flaps of the box from one another as the box moves past a cutting tool in the first direction, wherein the outer flaps overlie inner flaps. The method includes engaging a set of opening guides with the outer flaps of the box to drive the outer flaps open. The method includes opening inner flaps using shape memory and shuttling the box in the first direction over an inclined plane after the inner and outer flaps are open to flatten the box.

6 Claims, 5 Drawing Sheets

(58) Field of Classification Search
USPC ......... 229/117.01, 117, 117.05, 117.07, 125, 229/198.2, 155, 185, 117.04, 173; 493/162, 89, 183; 206/815; 53/139.7, 53/377.2, 396, 467, 491
See application file for complete search history.

(56) References Cited

U.S. PATENT DOCUMENTS

| | | | | | |
|---|---|---|---|---|---|
| 5,294,044 | A * | 3/1994 | Clark | B65D 5/001 229/149 |
| 2002/0011513 | A1* | 1/2002 | Dowd | B65D 5/4266 229/117 |
| 2002/0166887 | A1 | 11/2002 | Matsuoka | |
| 2005/0001020 | A1* | 1/2005 | Garnier | B65D 71/20 206/427 |
| 2005/0006446 | A1* | 1/2005 | Stafford, Jr. | B65D 5/10 229/157 |
| 2015/0115023 | A1* | 4/2015 | Brundage | B65D 5/6632 229/185 |
| 2016/0075465 | A1* | 3/2016 | Wiley | B65D 5/0015 206/509 |

* cited by examiner

BOX OPENING MOVEMENT WITH GUIDES

CROSS REFERENCE TO RELATED APPLICATIONS

This Application a U.S. National Phase Application filed under 35 U.S.C. § 371, based on International PCT Patent Application No. PCT/US2019/043352, filed Jul. 25, 2019, which application claims priority to U.S. Provisional Patent Application No. 62/713,636 filed on Aug. 2, 2018. The entire contents of these applications is incorporated herein by reference.

BACKGROUND OF THE INVENTION

1. Field of the Invention

The present disclosure relates to packaging, and more particularly to opening boxes for flattening.

2. Description of Related Art

Packaging products, e.g., for shipping, utilizes a considerable amount of boxes. After use, it is often desirable to flatten the used box for recycling or for palletization for reuse. Breaking down boxes for flattening can be a large volume proposition, but can be a challenge for automation as the box must be opened and the flaps must be arranged properly before the box can be flattened.

The conventional techniques have been considered satisfactory for their intended purpose. However, there is an ever present need for improved systems and methods for box opening and flattening. This disclosure provides a solution for this need.

SUMMARY OF THE INVENTION

A method of processing boxes includes shuttling a box in a first direction and cutting to separate outer flaps of the box from one another as the box moves past a cutting tool in the first direction, wherein the outer flaps overlie inner flaps. The method includes engaging a set of opening guides with the outer flaps of the box to drive the outer flaps open. The method includes opening inner flaps using shape memory and shuttling the box in the first direction over an inclined plane after the inner and outer flaps are open to flatten the box.

Engaging the set of opening guides can include shuttling the box in a second direction that is reverse of the first direction and engaging the set of opening guides with the outer flaps of the box to drive the outer flaps open as the box moves in the second direction. Cutting to separate the outer flaps can include cutting adhesive tape along a cut line parallel to the first direction to release the outer flaps from one another. The opening guides can be in a retracted position for cutting to separate the outer flaps, and the method can include extending the opening guides after cutting, engaging a respective guide hole in an end of the box with a respective one of the opening guides, and retracting the opening guides to the retracted position to drive the outer flaps open. Opening the inner flaps using shape memory can include using shape memory within a respective fold line connecting each respective inner flap to the box, wherein the shape memory biases the inner flaps to open. A shuttle can receives the box, shuttle the box in the first direction, then in the second direction, then again in the first direction and can release the box, and wherein the shuttle repeats this sequence for a plurality of boxes.

A system for processing boxes includes a frame, a cutting tool mounted stationary to the frame, and a pair of opposed opening guides mounted to the frame. An inclined plane is mounted to the frame and is configured to flatten a box. A shuttle is moveably connected to the frame and is configured to move a box in a first direction past the cutting tool and opening guides for cutting the box open, and to opening outer flaps with the opening guides, and for moving the box against the inclined plane to flatten the box, wherein the inclined plane is stationary relative to the frame and is inclined relative to the first and second directions of the shuttle. A box is engaged to the shuttle, wherein the box includes outer flaps configured to be opened by the opening guides, wherein the outer flaps overlie inner flaps of the box, wherein the box and inner flaps are configured so that the inner flaps open using shape memory when the outer flaps are opened.

The shuttle can be configured to move the box in a second direction reverse of the first direction for opening the outer flaps with the opening guides. The box can include adhesive tape configured to be cut along a cut line parallel to the first direction to release the outer flaps from one another. At least one linear actuator can be mounted to the frame and opening guides and can be configured to move the opening guides from a retracted position for cutting and to an extended position to engage a respective guide hole in an end of the box with a respective one of the opening guides, and to retract the opening guides to the retracted position to drive the outer flaps open.

The shape memory can be within a respective fold line connecting each respective inner flap to the box, wherein the shape memory biases the inner flaps to open. The box can be configured to collapse in parallelogram motion with the outer and inner flaps open.

A box includes a plurality of side panels formed around an interior space. A pair of opposed outer flaps foldably connected to two of the respective side panels, wherein the outer flaps are secured in a closed position to enclose one side of the box. The box includes a pair of opposed inner flaps, wherein the outer flaps overlie the inner flaps, and wherein the inner flaps are biased by shape memory to open upon opening of the outer flaps.

The box can include adhesive tape securing the outer flaps in the closed position. One of the side panels of the box can include a pair of guide holes each configured to receive a respective opening guide for opening the outer flaps. A respective fold line can connect each respective inner flap to a respective one of the side panels, wherein the shape memory is within the respective fold line to bias the inner flaps to open.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
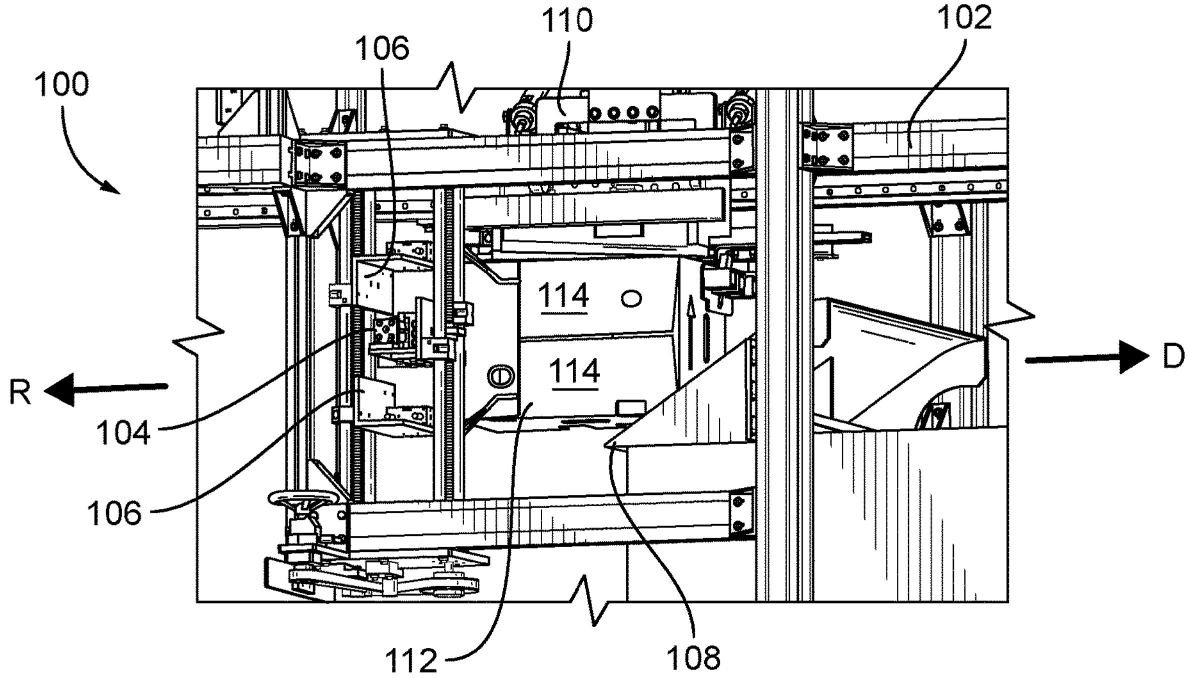
FIG. 1 is a schematic perspective view of an exemplary embodiment of a system for processing boxes constructed in accordance with the present disclosure, showing the shuttle and a box being processed.

Reference will now be made to the drawings wherein like reference numerals identify similar structural features or aspects of the subject disclosure. For purposes of explanation and illustration, and not limitation, a partial view of an exemplary embodiment of a system for processing boxes in accordance with the disclosure is shown in FIG. 1 and is designated generally by reference character 100. Other embodiments of systems in accordance with the disclosure, or aspects thereof, are provided in FIGS. 2-8, as will be described. The systems and methods described herein can be used to process boxes, e.g. for flattening empty boxes.

The system for processing boxes includes a frame 102. A cutting tool 104 is mounted stationary to the frame 102. A pair of opposed opening guides 106 is mounted to the frame 102. An inclined plane 108 is mounted stationary relative to the frame 102 and is configured to flatten boxes. A shuttle 110 is moveably connected to the frame 102 and is configured to move a box 112 in a first direction D, indicated with the large arrow in FIG. 1, past the cutting tool 104 and opening guides 106 for cutting the box 112 open, and in a second direction R that is the reverse of the first direction D for opening outer flaps 114 of the box 112 with the opening guides 106, and for moving the box 112 against the inclined plane 108 in the first direction D to flatten the box 112. The inclined plane is inclined relative to the first and second directions D, R of the shuttle 110.

Figure 2:
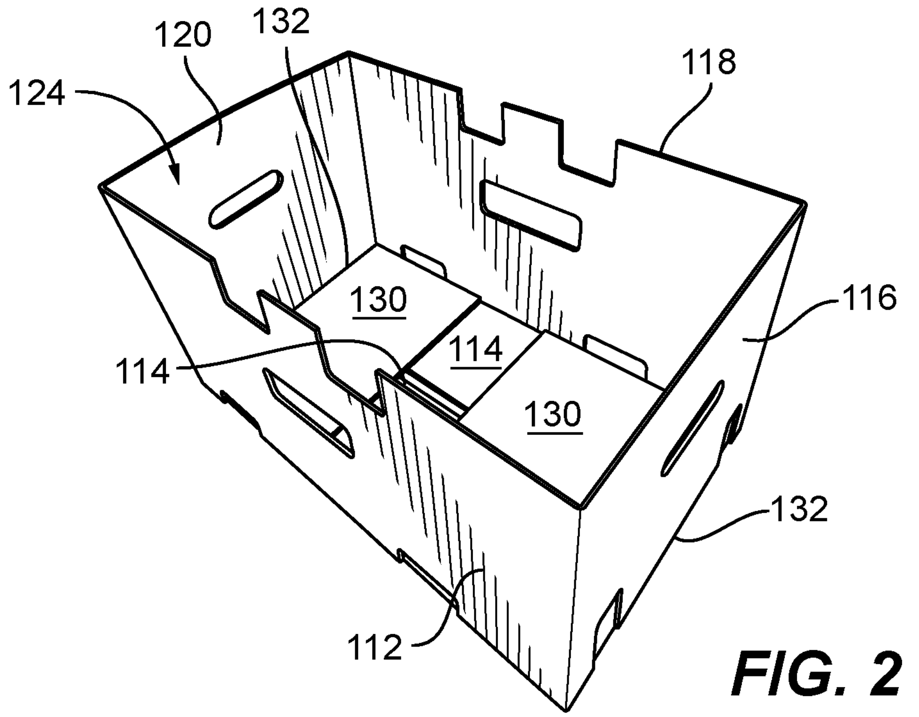
FIG. 2 is a perspective view of the box of FIG. 1, showing the open end of the box.
Figure 3:
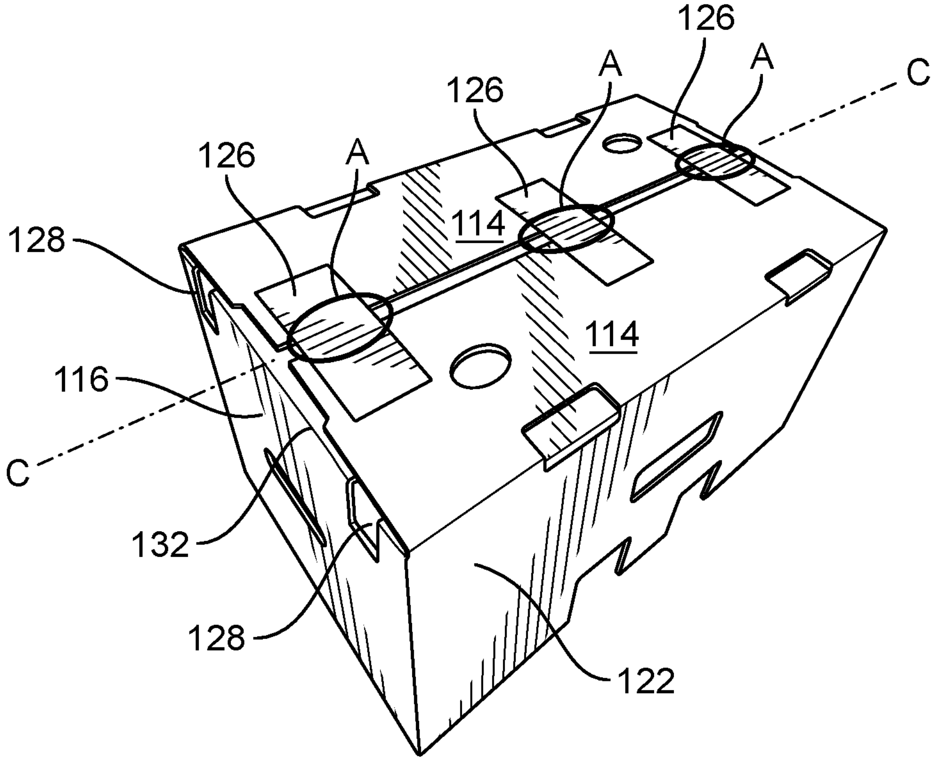
FIG. 3 is a perspective view of the box of FIG. 2, showing the adhesive tape securing the outer flaps.

With reference now to FIGS. 2 and 3, the box 112 can be engaged to the shuttle 110 (the shuttle 110 is shown in FIG. 1). The box 112 includes a plurality of side panels 116, 118, 120, 122 formed around an interior space 124. The pair of opposed outer flaps 114 is foldably connected to two of the respective side panels 118 and 122, wherein the outer flaps 114 are secured in a closed position by adhesive tape 126 to enclose one side of the box 112 prior to processing in the system 100 of FIG. 1. The adhesive tape 126 is configured to be cut along a cut line C that is parallel to the first direction D of FIG. 1 to release the outer flaps 114 from one another. FIG. 3 indicates the three areas A with circling where the adhesive tape 126 is cut on the cut line C to release the outer flaps 114.

Figure 8:
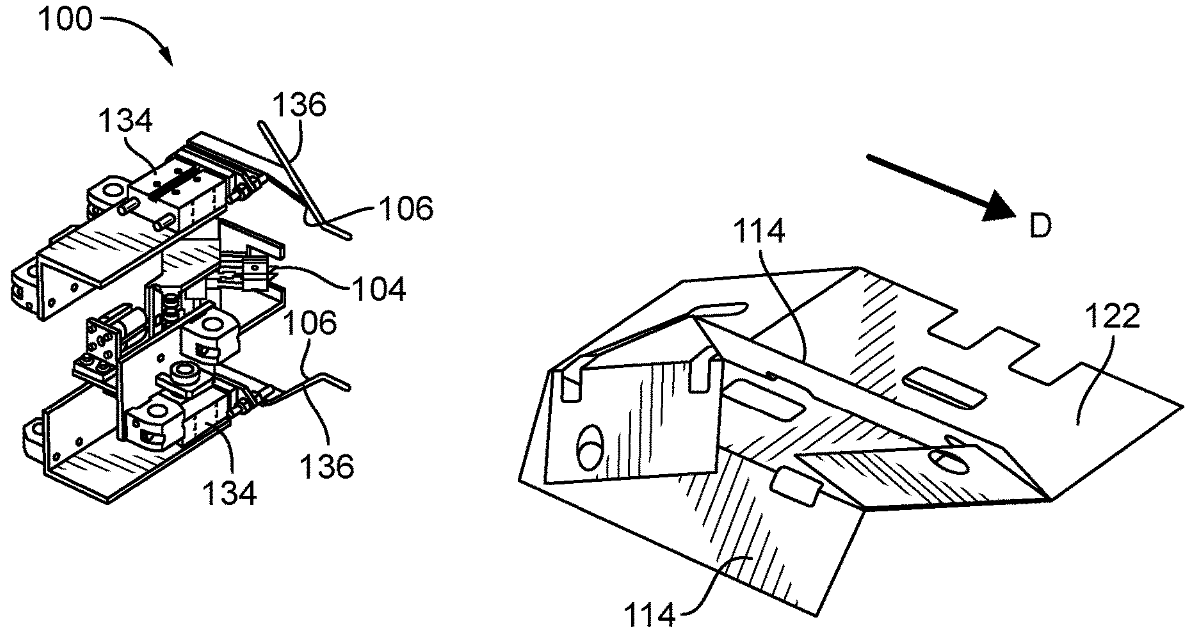
FIG. 8 is a schematic perspective view of a portion of the system of FIG. 1, showing the box being flattened in a parallelogram motion.

One of the side panels 116 of the box 112 includes a pair of guide holes 128 each configured to receive a respective opening guide 106 (shown in FIG. 1) for opening the outer flaps 114. The box 112 includes a pair of opposed inner flaps 130, wherein the outer flaps 114 overlie the inner flaps 130 when the box is in the closed configuration. The inner flaps 130 are biased by shape memory to open upon opening of the outer flaps 114. A respective fold line 132 connects each respective inner flap 130 to a respective one of the side panels 116, 120, wherein the shape memory is within the respective fold line 132 to bias the inner flaps 130 to open. The box 112 is configured so the side panels 116, 118, 120, 122 can collapse in parallelogram motion (as indicated in FIG. 8) with the outer and inner flaps 114, 130 open.

Figure 4:
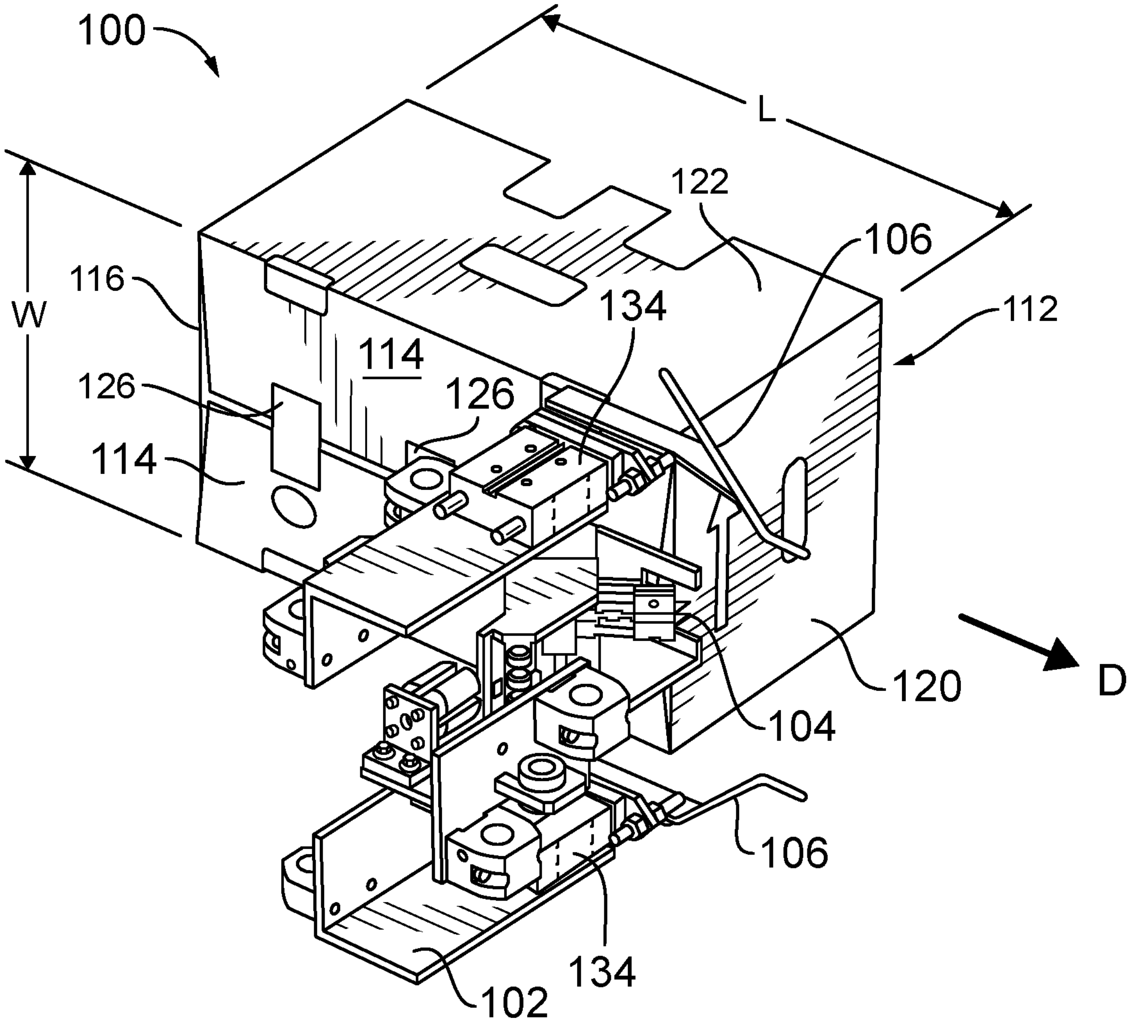
FIG. 4 is schematic perspective view of a portion of the system of FIG. 1, showing the box being cut as the box is shuttled in a first direction.

With reference now to FIG. 4, a method of processing boxes includes shuttling a box in a first direction D and cutting the adhesive tape 126 to the separate the outer flaps 114 of the box 112 from one another as the box 112 moves past the cutting tool 104 in the first direction D. The opening guides 106 are each mounted to the frame 102 by a respective linear actuator 134, which holds the opening guides 106 in the retracted position of FIG. 4 while the shuttle 110 (not shown in FIG. 4 but see FIG. 1) moves the box 112 past the cutting tool 104 to cut the adhesive tape 126.

Figure 5:
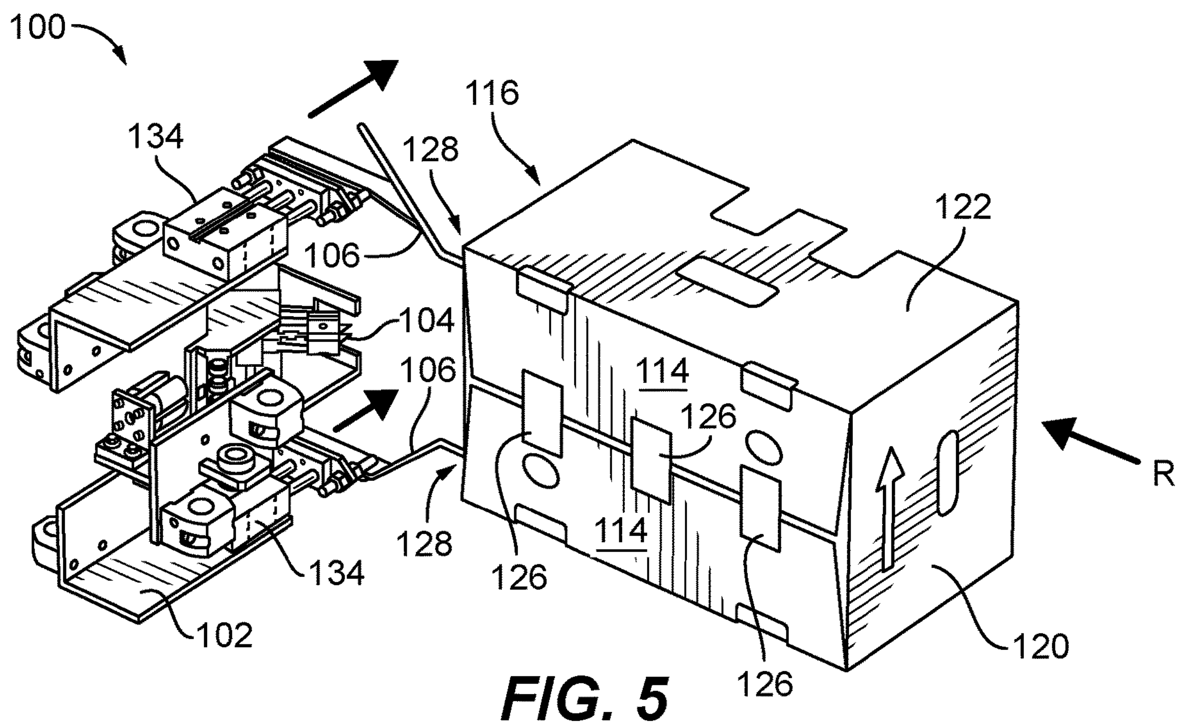
FIG. 5 is a schematic perspective view of a portion of the system of FIG. 1, showing the box being engaged with the opening guides as the box moves in a second direction reverse of the first direction.
Figure 6:
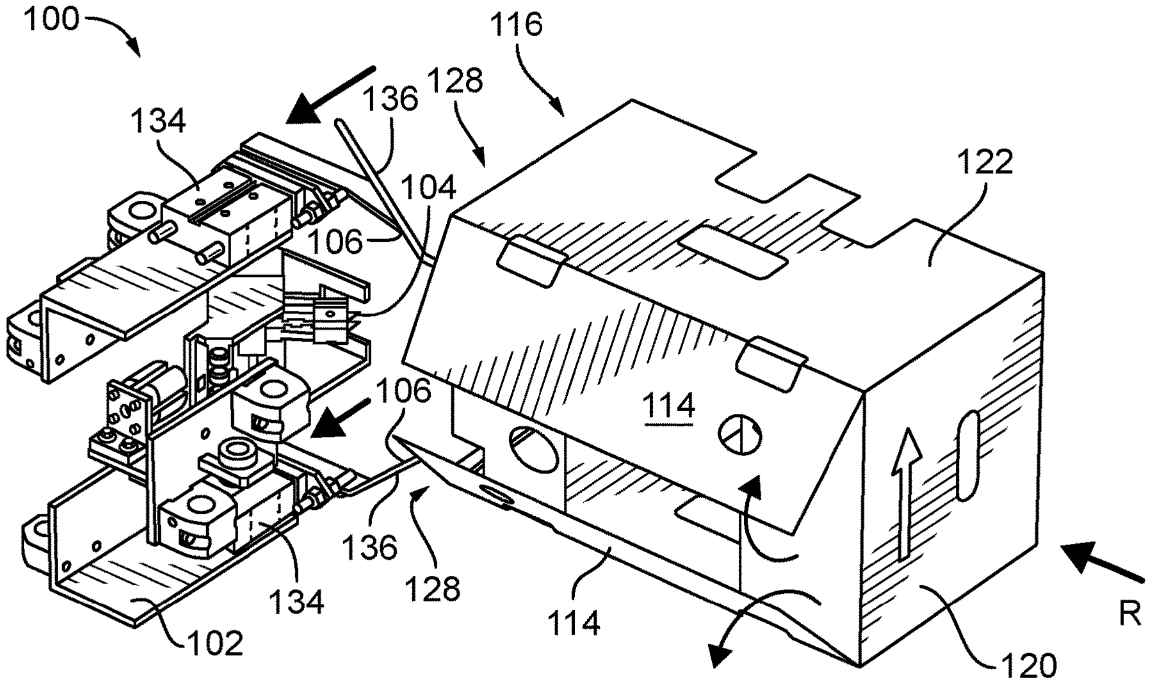
FIG. 6 is a schematic perspective view of a portion of the system of FIG. 1, showing the outer flaps opening.

With reference now to FIG. 5, after cutting, the linear actuators 134 extend the opening guides 106 to an extended position as indicated in FIG. 5 with extension arrows, to engage the opening guides 106 with the respective guide holes 128 in an end of the box 112. The method includes shuttling the box 112 (using the shuttle 110 of FIG. 1) in the second direction R and engaging the opening guides 106 with the outer flaps 114 of the box 112 to drive the outer flaps 114 open as the box moves in the second direction, as indicated by the rotation arrows shown in FIG. 6. Opening the flaps is facilitated by the actuators 134 retracting the opening guides 106 back to the retracted position as indicated in FIG. 7 with the retracting arrows, as well as by the inclined bars 163 of the opening guides 106, which are inclined relative to the first and second directions D, R of FIG. 1.

Figure 7:
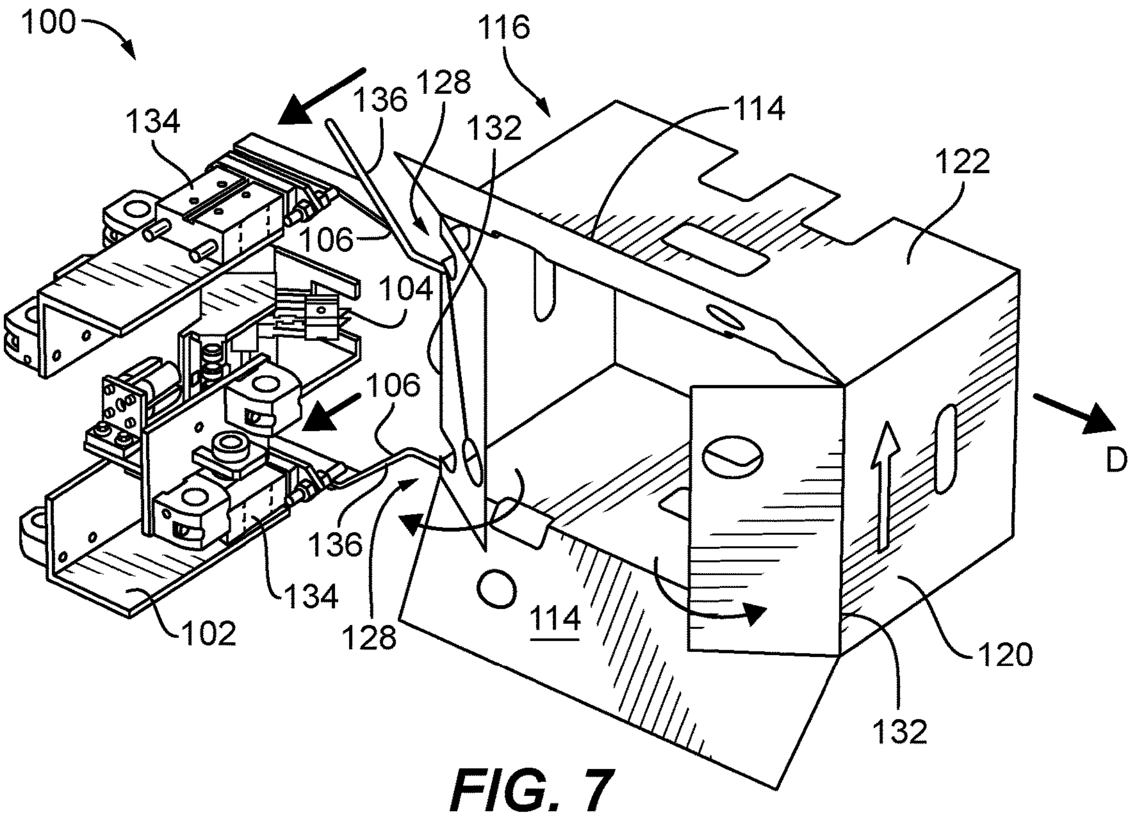
FIG. 7 is a schematic perspective view of a portion of the system of FIG. 1, showing the inner flaps opening under the force of shape memory.

With reference to FIG. 7, the shuttle 110 (shown in FIG. 1) reverses direction again, to move in the first direction D with the outer flaps 114 open. As the outer flaps 114 and opening guides 106 clear the inner flaps 130, the shape memory of the inner flaps 130 (i.e., the bias in the fold lines 132) opens the inner flaps as indicated by the rotation arrows in FIG. 7. As the shuttle 110 (shown in FIG. 1) continues to drive the box 112 over the inclined plane 108 (shown in FIG. 1), and with the inner and outer flaps 114 and 130 open, the panels 116, 118, 120, 122 of the box 112 fold in parallelogram motion as indicated in FIG. 8 until the box 112 is flattened.

With reference again to FIG. 1, the shuttle can receive a box 112, shuttle the box 112 in the first direction D, then in the second direction R, then again in the first direction D as described above, and can then releases the box 112. A new box 112 can then be supplied to the shuttle 112, which can then repeats the sequence above over and over for a plurality of boxes. The opening and flattening of a plurality of boxes 112 can thus be automated using system 100.

If it is ever desired to use a box 112 with a different width from what is shown in FIGS. 4-8, i.e., where the box as oriented in FIG. 4 is taller or shorter in the vertical dimension W, the guide holes 136 may be further apart from one another or closer together than shown in FIG. 4. Therefore, a vertical repositioning of one or both of the opening guides 106 (as oriented in FIG. 4) and/or the cutter 104 can accommodate the change in box width W, and the box opening procedure described above can be carried out in the same manner regardless of how wide the box 112 is. For example, if adjusting to accommodate a different size of box 112 in terms of dimension W, then the upper opening guide 106 as oriented in FIG. 4 can be maintained in its position, and the cutter 104 and the lower opening guide 106 can be lowered to match the cutting height and lower guide hole 136 position in the different sized box 112. Moreover, if it is desired to flatten boxes of a different length dimension L as oriented in FIG. 4, the stroke of the shuttle 110 can be adjusted to accommodate the different length L, e.g., by reprograming the control of brushless motors to drive the shuttle 110.

The methods and systems of the present disclosure, as described above and shown in the drawings, provide for processing boxes with superior properties including opening and flattening the boxes with improved facility over traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A box comprising:

a plurality of side panels formed around an interior space;

a pair of opposed outer flaps foldably connected to two of the respective side panels, wherein the outer flaps are secured in a closed position to enclose one side of the box; and a pair of opposed inner flaps, wherein the outer flaps overlie the inner flaps, wherein at least one of the side panels is configured to form an end of the box and comprises a pair of guide holes, wherein the pair of guide holes are defined in the end of the box, wherein each of the pair of guide holes is configured to receive a respective opening guide for opening the outer flaps, the pair of guide holes are shaped to allow the respective opening guide to engage with a respective one of the pair of guide holes for movement in two different directions to open the outer flaps without engaging with the inner flap, wherein the inner flaps are biased by shape memory to open upon opening of the outer flaps.

2. The box as recited in claim 1, further comprising adhesive tape securing the outer flaps in the closed position.

3. The box as recited in claim 1, wherein a respective fold line connects each respective inner flap to a respective one of the side panels, wherein the shape memory is within the respective fold line to bias the inner flaps to open.

4. The box as recited in claim 1, wherein the box is configured so the side panels can collapse in parallelogram motion with the outer and inner flaps open.

5. The box as recited in claim 1, wherein at least other of the side panels is configured to form an opposing end of the box that opposes the end of the box, and wherein the opposing end is free of guide holes.

6. The box as recited in claim 1, wherein the two different directions of movement of the respective opening guide are substantially perpendicular to each other.

* * * * *